S. S. COLT.
MOLDING APPARATUS.
APPLICATION FILED JULY 29, 1916.

1,217,416.

Patented Feb. 27, 1917.
6 SHEETS—SHEET 1.

Fig. 1

WITNESSES:
Fredk. H. W. Fraentzel.
Eva E. Lesch.

INVENTOR:
Samuel S. Colt,
BY
Fraentzel and Richards,
ATTORNEYS

S. S. COLT.
MOLDING APPARATUS.
APPLICATION FILED JULY 29, 1916.

1,217,416.

Patented Feb. 27, 1917.
6 SHEETS—SHEET 3.

Fig. 3

WITNESSES:
Fred'k H. W. Fraentzel
Eva E. Pasch

INVENTOR:
Samuel S. Colt,
BY
Fraentzel and Richards,
ATTORNEYS

S. S. COLT.
MOLDING APPARATUS.
APPLICATION FILED JULY 29, 1916.

1,217,416. Patented Feb. 27, 1917.
6 SHEETS—SHEET 4.

WITNESSES:
Eva E. Desch
Fredk H. W. Fraentzel

INVENTOR:
Samuel S. Colt,
BY
Fraentzel and Richards,
ATTORNEYS

S. S. COLT.
MOLDING APPARATUS.
APPLICATION FILED JULY 29, 1916.

1,217,416.

Patented Feb. 27, 1917.
6 SHEETS—SHEET 6.

WITNESSES:
Fredk. H. W. Fraentzel
Eva E. Desch.

INVENTOR:
Samuel S. Colt,
BY
Fraentzel and Richards
ATTORNEYS

UNITED STATES PATENT OFFICE.

SAMUEL S. COLT, OF ORANGE, NEW JERSEY.

MOLDING APPARATUS.

1,217,416.                Specification of Letters Patent.          Patented Feb. 27, 1917.

Application filed July 29, 1916. Serial No. 112,004.

*To all whom it may concern:*

Be it known that I, SAMUEL S. COLT, a citizen of the United States, residing at Orange, in the county of Essex and State of New Jersey, have invented certain new and useful Improvements in Molding Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates generally, to improvements in concrete construction, or rather in the manner of forming or molding and in the use of concrete, or other material which can be molded and which will set and harden, so as to be used as a substitute for stone, bricks, steel, hollow tile, etc., in the construction of walls, buildings, and for all kinds of engineering construction where concrete or the like may be applicable; and, the present invention has reference, more particularly, with the use of concrete or other material adapted as a substitute for stone, bricks, steel, hollow tile, or the like, a novel cribbing device, to be employed as a forming means which can be easily and quickly erected, and can be used many times over and over without deterioration, so as to produce an economical cribbing means or form.

The present invention, therefore, has for its principal object to provide a novel and effective means, employed as a form in the production of walls, buildings, and in engineering construction of concrete, or other similar material, with a view of providing a cribbing which can be used at many different times without deterioration or destruction after the work has been completed, and to produce, principally, a perfectly formed wall or structure in any shape, as desired, and the outside face of which is not marred by having in its face holes, wire, or as in sometimes the case, parts of the cribbing or form remaining in the wall.

The invention has for its further object to make what is known in the building trade or in engineering construction pertaining to concrete construction, or where similar material is employed, a wall or structure having a perfect joining, or rather a construction in which the joints are not discernible.

The invention has for its further object to provide novel, simply-constructed, and readily applicable means, for detachably securing suitable form-sections or elements to suitable uprights of the cribbing, so that the said form-sections or elements are securely and tightly held to prevent leakage of moisture or water at the various joints between the said form-sections or elements.

While, in practice, the various form-sections or elements may be made of wood, metal, or other suitable material, wood is preferably employed, since it is much cleaner in use, and obviates the danger of producing a spotted face of the finished wall of structure, due to rust or other deleterious effects caused by constantly employed form-sections or elements made of iron, steel, or other metal or material.

The invention has for its further purpose to provide a finished concrete or similar construction, as a substitute for stone-steel, or the like which is capable of expansion and contraction in the several directions, similar to the expansion and contraction of walls or structures built on the unit system, such as walls made of bricks and mortar, or structures composed of blocks of stones laid upon each other.

Other objects of the present invention not at this time more particularly enumerated will be clearly understood from the following detailed description of the present invention.

With the various objects of the present invention in view, the said invention consists, primarily, in the novel structure or wall of concrete or other similar material, as hereinafter set forth; and, the invention consists, furthermore, in the novel forming or molding means, as well as in the general arrangements and combinations of the several devices and parts, and in the details of the construction of the said parts, all of which will be more fully described in the following specification, and then finally embodied in the clauses of the claim which are appended to and which form an essential part of the said specification.

The invention is clearly illustrated in the accompanying drawings, in which:—

Similar characters of reference are employed in all of the said above described views, to indicate corresponding parts.

Referring now to the said drawings, the reference-character 1 indicates a series of suitable uprights, which are preferably of rectangular cross-section and may be of any desirable length. These uprights which are preferably made of wood, and are usually what is known in the building trade, as two by fours, are suitably disposed in their vertical positions by means of any usual "bracing," or in any other desired manner, at points desirably distant apart upon the inner side of the concrete wall or structure to be produced. The reference-character 2 indicates a series of other uprights, also preferably made of wood, and known as two by fours, although both the uprights 1 and 2 may be of other suitable cross-section, are placed in their vertical positions, at points directly opposite to uprights 1 upon the outer side of the concrete wall or structure to be built. In starting to build the wall or structure, as 3, of concrete or other similar material, the lower end-portions of the several uprights 1 and 2 are placed so that they will rest upon the ground, or other suitable foundation upon which the concrete wall or structure is to be erected, the said uprights 1 being suitably braced or otherwise secured in place so as to be plumb as to their vertical alinement.

Figure 1:
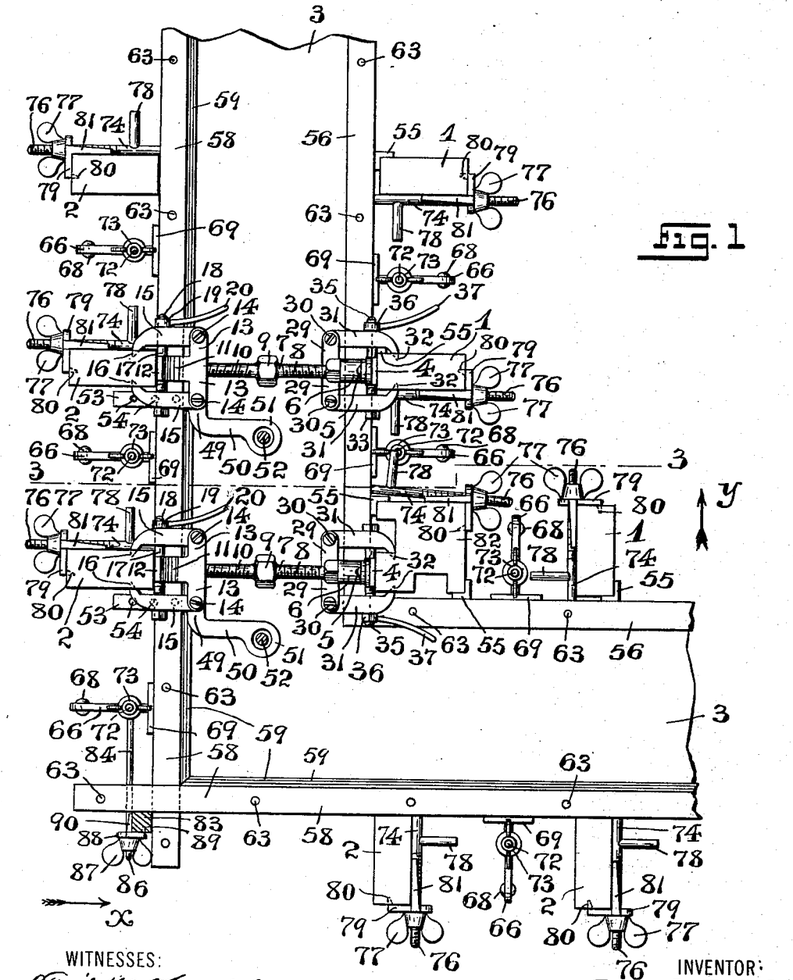
Figure 1 is a top or plan view of a portion of a partly finished wall made of concrete, or similar mixture, and a portion of the cribbing and its form-sections or elements and securing or fastening devices, all arranged to illustrate one embodiment of the principles of the present invention.
Figure 3:
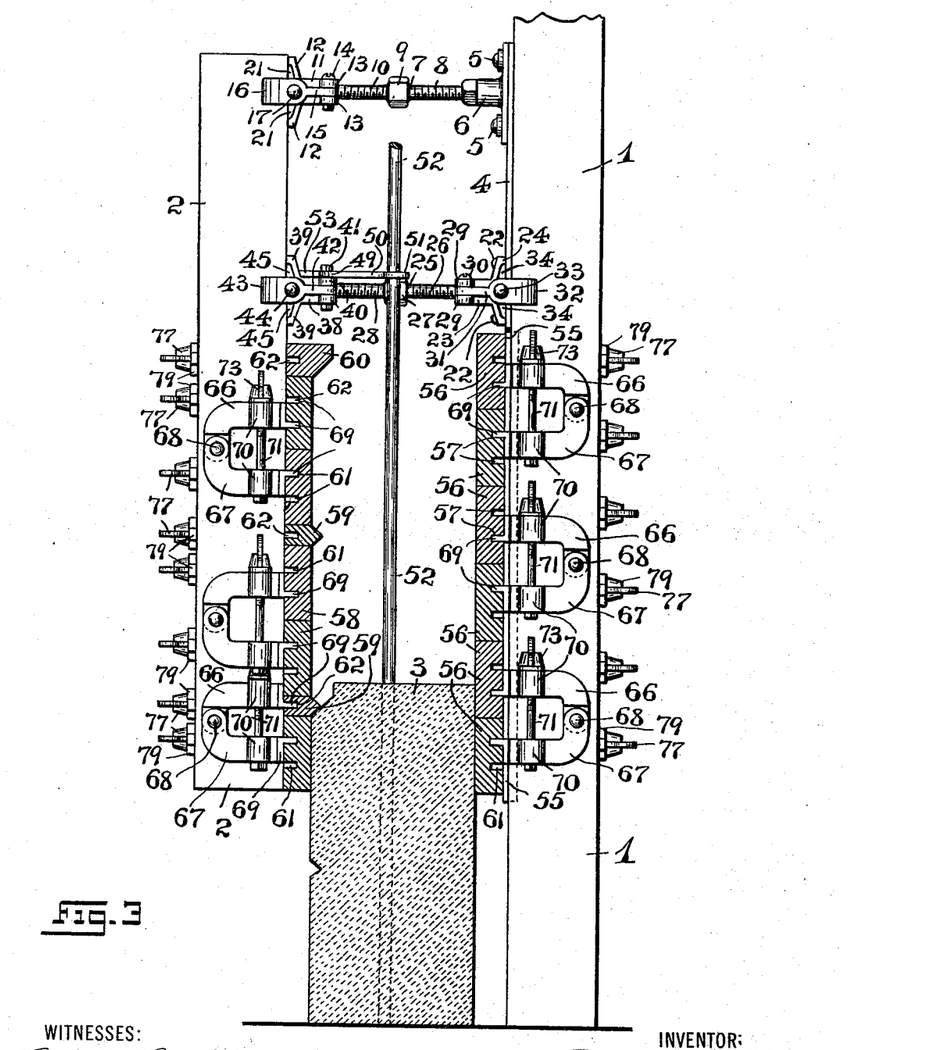
Fig. 3 is a transverse vertical section of the same, said section being taken on line 3—3 in said Fig. 1, looking in the direction of the arrow *y*.

The respectively oppositely disposed uprights 1 and 2 are suitably alined and properly spaced apart, laterally across the wall or structure to be built by means of an arrangement of suitably constructed combined holding or retaining and spacing devices. These devices are adjustably and detachably connected with the respective uprights 1 and 2, and each device, in the present case, consists, essentially of a plate-like member or flat-bar, as 4, adapted to be placed against one of the faces of the upright 1, substantially as indicated in Figs. 1 and 3 of the drawings. At or near its upper end, the said member or bar 4 has secured thereto by means of screws or rivets, as 5, or has connected therewith in any other suitable manner, an internally screw-threaded socket, as 6, into which is screwed the screw-threaded end-portion 8 of an adjusting rod 7. The said rod 7 is also provided with a nut-shaped portion, as 9, upon which may be placed a wrench for turning said rod, or the said rod may be provided or formed with any other suitably constructed turning means, as will be evident.

Extending from the said turning member or nut-shaped portion 9 is another screw-threaded shank-portion 10 of the rod 7, the free end of the said shank-portion 10 being screwed into a screw-threaded part of a block 11 having a foot-portion 12 adapted to be brought into bearing contact with one of the faces of the upright 2. The screw-threaded shank-portions 8 and 10 of the rod 7 are respectively right and left screws, the purpose of which will be self-evident.

The said block 11 is also provided with oppositely projecting arms 13, arranged in pairs, substantially as shown, and carry pivot-pins, as 14, which may be in the form of suitable screws or bolts, as will be evident. Pivotally connected with the said pivot-pins 14 are suitably formed vise or clamping members 15 formed with clamping or biting end-portions, as 16. In practice, the end-portions 16 are disposed upon opposite sides of the said upright 2, and are forced into positive but detachable engagement with the said upright 2, by means of a connecting bolt 17 arranged in suitable holes or perforations with which the vise or clamping members 15 are provided and extends beneath an open portion, as 21, of the foot-portion 12. Upon the screw-threaded end-portion 18 of the said bolt 17 is a nut-like or other suitably formed tightening member, as 19, which may be provided with a suitable operating lever 20 for tightening the said members 15 and their jaws 16 in securely fastened relation with the upright 2, as will be evident.

Also suitably secured at or near the lower end of the previously mentioned member or bar 4 by means of screws or rivets, as 22, or by means of any other suitable fastening means, is a block 23 having a foot-portion, as 24, substantially as illustrated. Suitably connected with this block 23 is the screw-threaded end-portion 26 of an adjusting rod 25, the said rod 25 being also provided with a nut-shaped portion, as 27, upon which may be placed a wrench for turning said rod, or the said rod may be provided or formed with any other suitably constructed turning means, as will be evident. Extending from the said turning member or nut-shaped portion 27 is another screw-threaded shank-portion 28, for the purposes to be presently more fully specified, the said screw-threaded shank-portions 26 and 28 being, respectively, right and left screws. The said block 23 is also provided with oppositely projecting arms 29, arranged in pairs, and carry pivot-pins 30 which may be in the form of suitable screws or bolts. Pivotally connected with the said pivot-pins 30 are suitably formed vise or clamping members 31 formed with clamping or biting end-portions, as 32. These end-portions 32 are disposed upon opposite sides of the said upright 1, and are forced into positive but detachable engagement with said upright 1, by means of a connecting bolt 33 arranged in suitable holes or perforations with which the vise or clamping members 31 are provided and extends beneath an open portion, as 34, of the foot-portion 24. Upon the screw-threaded end-portion 35 of the said bolt 33 is a nut-like or other suitably formed tightening member, as 36, which may be provided with a suitable operating lever 37 for tightening said members 31 and their jaws 32 in securely fastened relation with the upright 1, whereby the said member or bar 4 and the various parts connected therewith are positively, but separately, secured in adjustable positions upon the upright 1, as will be clearly understood from an inspection of the several figures of the drawings.

The free end-portion of the screw-thread shank-portion 28 of the adjusting rod 25 is screwed into the screw-threaded part of another block, as 38, having a foot-piece 39 adapted to be brought into bearing contact with one of the faces of the upright 2. The said block 38 is also provided with oppositely projecting arms 40 arranged in pairs, and carry pivot-pins, as 41, which may be in the form of suitable screws or bolts. Pivotally connected with the said pivot-pins 41 are suitably formed vise or clamping members 42 formed with clamping or biting end-portions 43. These end-portions 43 are disposed upon opposite sides of the upright 2, and are forced into positive but detachable engagement with the said upright 2, by means of a connecting bolt 44 arranged in suitable holes or perforations with which the said vise or clamping members 42 are provided, and extends beneath an open portion, as 45, of the foot-portion 39 of the block 38. Upon the screw-threaded end-portion 46 of the bolt 44 is a nut-like or other suitably formed tightening member, as 47, which may be provided with a suitable operating lever, as 48, for tightening the said vise or clamping members 42 and their jaws 43 in securely fastened relation with the upright 2. When the hereinabove described upright-alining device has in this manner been properly connected with and secured to each pair of oppositely placed uprights 1 and 2, proper alinement of the said uprights 1 and 2, according to the thickness of the wall or structure 3 desired can then be readily made turning each adjusting rod 7 and 25 as may be necessary, to bring the oppositely placed uprights 1 and 2 closer together or farther apart as may be necessary. If desired, there may be fulcrumed upon one of the pivot-pins 41 of one of the arms 40 of each block 38 a rod-steadying bar or plate, as 49, one of the arm-portions 50 thereof having an eye, as 51, for steadying and centering in position, prior to the pouring operation of the concrete or other suitable mixture, a reinforcing rod 52 of the usual construction. The other arm-portion 53 of the said steadying bar or plate 49 may be provided with a series of holes or perforations 54 for the proper adjustment of said bar or plate with relation to the pivot-pin 41 and to the reinforcing rod 52, as will be clearly evident.

Figure 2:
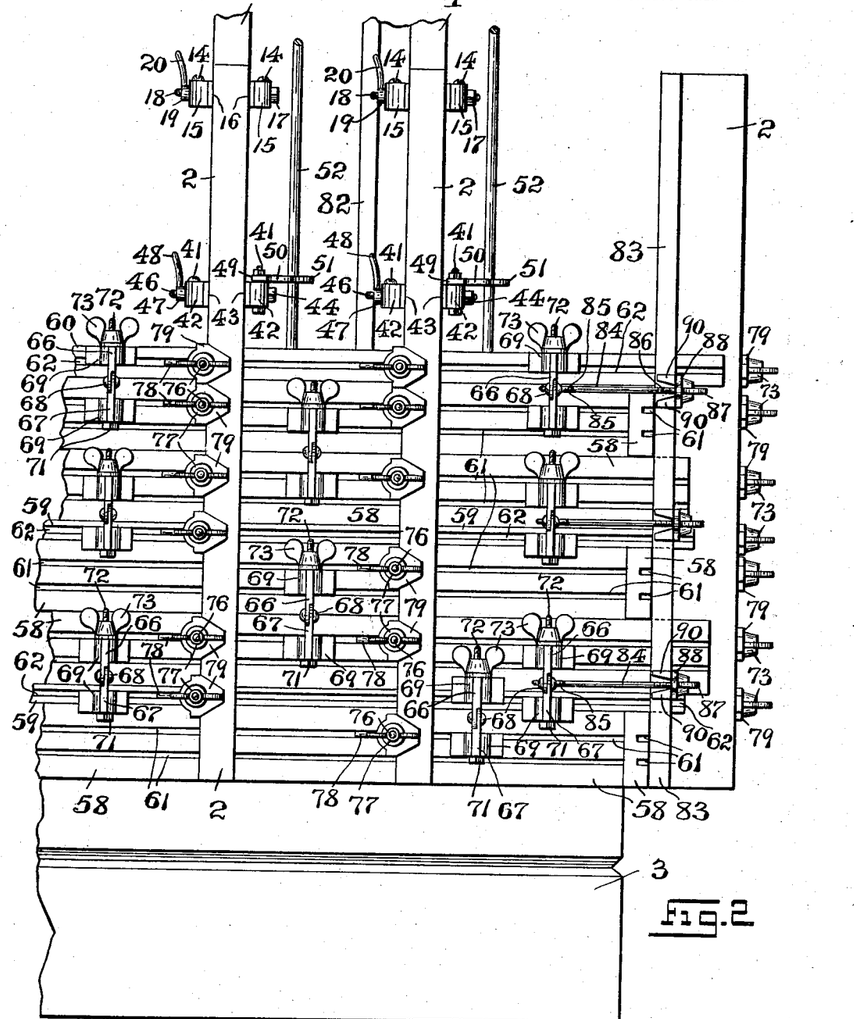
Fig. 2 is a front face view of the wall-portion, and of the devices and parts of the cribbing shown in said Fig. 1, looking in the direction of the arrow *x* in said Fig. 1.

In order to provide the forming trough or mold of any suitable length and any desired height there are arranged against the said uprights 1, angular or L-shaped members 55 which are usually made of metal, and the purpose of which will be presently set forth. Against these angular or L-shaped members are placed in sequence, one upon the other, to any suitable height, a number of longitudinally extending form-sections or members, as 56, in the form of boards of any suitable lengths, which may be of wood, or any other suitable material, said boards being usually provided with longitudinally disposed rabbets, grooves, or channels, as 57. Similarly arranged against the said uprights 2, substantially in the manner illustrated in Figs. 1, 2 and 3 of the drawings, is another series of form-sections or members, in the form of boards, as 58, with interdisposed joint-strips, as 59 and 60, the said boards 58 and joint-strips 59 and 60 being of any suitable lengths, and being made of wood or any other suitable material, the said boards 58 being usually provided with the longitudinally disposed rabbets, grooves, or channels 61, and the said joint-strips 59 and 60 being likewise made with longitudinally extending rabbets, grooves, or channels, as 62. In practice, I prefer to make the several form-sections or members 56 and 58, as well as the joint-strips 59 and 60, which may be of any suitable cross-section, of wood, on account of cheapness of construction and great reduction in weight, and also on account of cleanliness, since the wood will not be subjected to staining effects due to water and moisture, as is the case where metal sections and metal strips are employed, so that when the cribbing is removed from the finished wall-portions, the faces of the latter will not have become unsightly with rust-spots or other objectionable deleterious effects.

Figure 6:
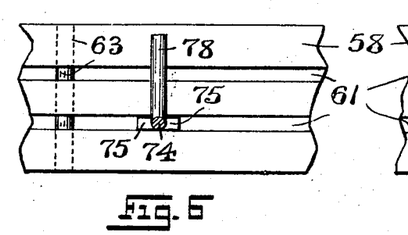
Fig. 6 is a face view of a fragmentary portion of one of the grooved or channeled form-sections or elements, with a sectional representation of one of the fastening devices for tying the said form-sections to the uprights of the cribbing, illustrating the manner of inserting the lifting or holding end of the said fastening devices into one of the grooves or channels in said form-section or element.
Figure 7:
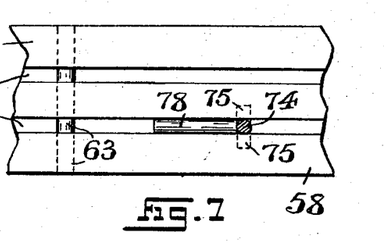
Fig. 7 is a similar view of the same parts, showing the fastening device turned at an angle, with the biting or holding end of said device secured in its holding relation with the body-portions of the said form-section or element, contiguous to the groove or channel.

The employment of the rabbets, grooves, or channels with which the said form-sections or boards 56 and 58, and the joint-strips 59 and 60 are provided, is two-fold, said rabbets, grooves, or channels serving as a means for the application thereto of suitable clamping devices for retaining said various elements in their vertically stacked relation, as will hereinafter appear, and also to prevent warping. As an extra precaution against the warping of the form-sections or boards, the said sections or boards may have driven or otherwise arranged therein, at suitable and desired points, metallic pins 63, or the like, which may be arranged as shown in Fig. 4 of the drawings, or as illustrated in Figs. 6 and 7.

Figure 4:
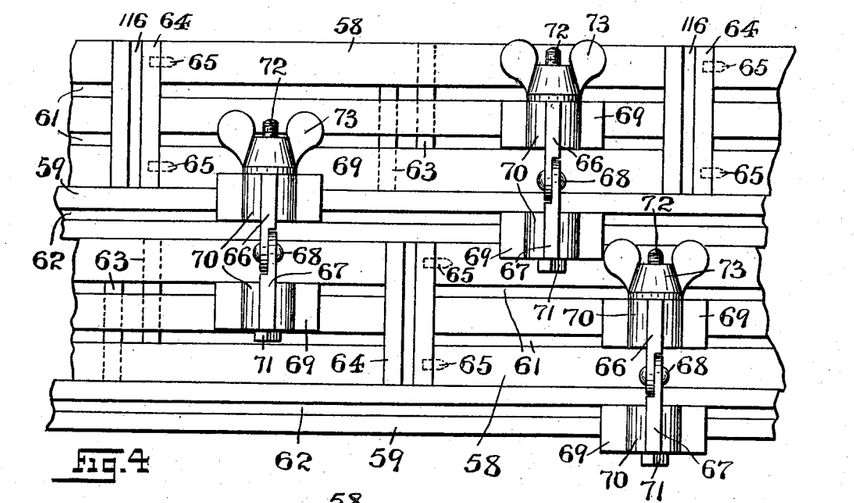
Fig. 4 is a front face view of a fragmentary portion of a cribbing comprising an arrangement of horizontally disposed form-sections or elements and intermediately placed and horizontally disposed joint-strips, with vertically placed joint-strip, showing in connection therewith an arrangement of fastening means for securing said form-sections and the various joint-strips in assembled relation, to provide a concrete wall or structure in imitation of a series of blocks or stone, the uprights and clamping or securing devices represented in connection with the construction illustrated in said Figs. 1, 2 and 3, being omitted from said view.
Figure 5:
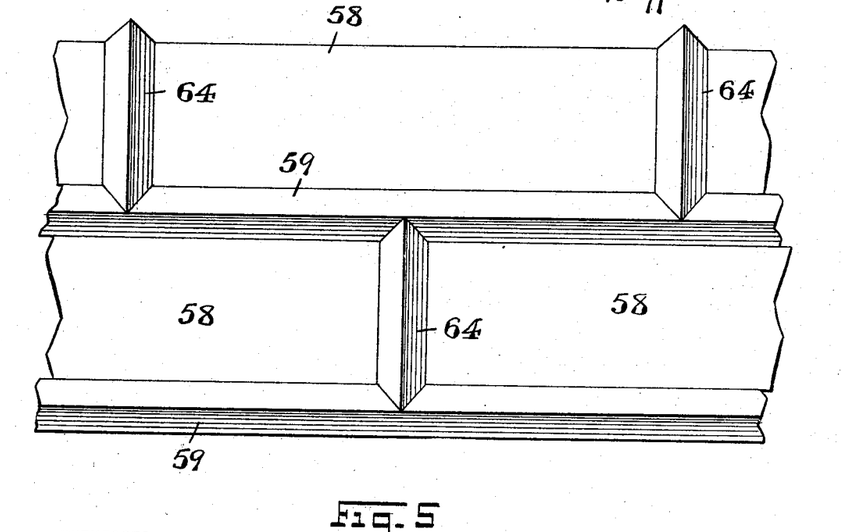
Fig. 5 is a rear face view of the said form-sections, horizontal joint-strips, and vertical joint-strips.

In some instances, where the face of the concrete wall or structure is to be made in representation of a series of blocks or in imitation of a brick-structure, the various form-sections are made of short lengths, and are alternated with the longitudinally extending joint-strips, suitably formed and vertically disposed joint-strips, as 64, are placed at desired intervals between the end-portions of the said form-sections and between the longitudinally extending joint-strips, in a manner as illustrated in Figs. 4 and 5 of the drawings, the said vertically disposed joint-strips 64 being provided with fastening pins or dowels 65 projecting from one of the side-faces of each strip 64 and being suitably forced into retaining or holding engagement with the end-portion of the next-placed form-section or board, substantially as indicated in said Fig. 4 of the drawings.

Any number of clamping devices may be employed for firmly retaining in vertically stacked relation a series of form-sections 56 against the uprights 1, and a series of form-sections 58 and interposed joint-strips in vertically stacked relation against the uprights 2. One style or form of such clamping devices comprises a pair of L-shaped members or arms, as 66 and 67, said members or arms being pivotally connected, as at 68. At their free end-portions the said members or arms are made with laterally extending gripping elements, as 69, preferably of the angular cross-section shown more particularly in Fig. 3 of the drawings, which are inserted in the respective rabbets, grooves or channels 57 of any two adjacent form-sections or boards 56, and in the respective rabbets, grooves or channels 61 of any two adjacent form-sections or boards 58, or into the respective rabbets, grooves or channels 61 and 62 of any adjacent form-sections or boards 58 and longitudinally extending joint-strips 59 or 60, as will be clearly understood from an inspection of said Fig. 3. To maintain the clamped relation of the said gripping elements 69 with the various form-sections or boards and with the joint-strips, the said members or arms 66 and 67 are made with perforated knob-like portions 70 in which is arranged a tightening bolt 71 having upon its screw-threaded shank-portions 72, a suitable tightening nut, as 73. By tightening upon this nut, it will be evident, that the members or arms 66 and 67 can be brought closer together, thereby causing the gripping elements 69 to closely draw the adjacent form-sections or boards, or the adjacent joint-strips and form-sections or boards together so as to produce a leakage-proof connection between the various elements, as will be clearly evident. The various form-sections thus clamped together and arranged against the uprights 1, and the clamped form-sections and joint-strips arranged against the uprights 2 are securely held by an arrangement of any suitable number of tying devices, preferably of the construction represented in Figs. 1, 2, 3, 4, 5, 6 and 7 of the drawings.

Each tying device consists, essentially, of a rod-like member 74 formed at one end with a pair of retaining fingers or jaws 75, and at its other end the said rod or member 74 being formed with a screw-threaded shank-portion 76 upon which is screwed a tightening nut, as 77. Intermediate of the said fingers or jaws 75 and the said screw-threaded shank-portion 76, the said rod-like member 74 has an extension, as 78, which provides a lever or fingerpiece for turning said member 74 in the manner and for the purposes to be presently more fully described. Loosely disposed upon each rod or member 74 is a perforated retaining element, in the form of a plate 79 having a biting teat or projection, as 80, and a pair of right-angled guide-members 81. In connecting each tying device to a form-section or a joint-strip, the fingers or jaws 75 are inserted in a rabbet, groove, or channel, in the manner indicated in Fig. 6 of the drawings. By means of the extension or lever 78, the said rod or member 74 is given a quarter turn so as to bring the fingers or jaws 75 into the positions indicated in dotted outline in said Fig. 6, the fingers or jaws 75 being thereby securely embedded in the adjacent body-portions of the wood form-section or joint-strip, as the case may be and securing the rod or member 74 in a positive position to enable a pull upon the form-section or the joint-strip without danger of the said rod or member breaking away from its connected relation with said form-section or the joint-strip. The plate 79 and guide-members 81 of the retaining element upon said rod or member 74 is now placed upon the respective upright 1 or 2, as indicated more particularly in Fig. 1 of the drawings. By screwing up the nut 77, the assembled and vertically stacked and clamped form-sections 56 are tightly drawn against and tied to the uprights 1, and the similarly arranged form-sections 58 and joint-strips 59 and 60 are tightly drawn against and tied to the short uprights 2, as will be fully understood from an inspection of said Figs. 1, 2 and 3 of the drawings.

Thus, as will be evident, a complete cribbing and mold has been produced for forming therein the wall of concrete or other similar material, as will be understood from an inspection of Fig. 3 of the drawings.

After the mass 3 has hardened, by simply loosening the rods or levers 37, and the tying devices connected with the upright 1, the entire arrangement of the assembled devices, with the short uprights 2 can be raised, and secured in such raised positions upon the uprights 1, by again tightening the rods or levers 37, and the said tying devices upon the uprights 1, so that the pouring operation can be continued, and another portion of wall formed upon the previously completed wall. After the wall has been finally completed, the various devices and parts of the cribbing are easily disconnected and are stored away for future use.

The use of the previously mentioned angular or L-shaped members 55, arranged against the uprights 1 in the manner shown and as previously stated, is to permit of the quick separation and dismemberment of the various devices and parts, after having loosened the various tying and clamping devices by driving said members 55 out of place, so that the form-sections 56 can be readily taken away from the inner face of the finished wall.

When the wall is to be provided with a corner, as indicated in Fig. 1 of the drawings, to enable the clamping devices to be attached to the upright at the inner angle of the corner, a corner upright, as 82, preferably of the cross-section shown in said Fig. 1 is employed. At the outer angle of the said corner, where it may happen that the form-sections or joint-strips overlap as shown, in order not to have to cut away a portion of the form-section or board, or of the joint-strip, I employ a parting strip, as 83, and to some of the bolts 71 for tightening the arms or members 66 and 67, I attach by means of a hook-shaped or eye-portion 85 a tie-rod 84 formed with a screw-threaded shank-portion 86 and a tightening nut 87. Loosely disposed upon each tying rod 84 is a perforated retaining element, in the form of a plate 88 having a biting teat or projection 89 and a pair of guide-members 90 which are arranged against the strip 83 and are secured in their fastened position to said strip 83 when the nut 87 is tightened, as will be clearly understood from an inspection of said Fig. 1.

Figure 11:
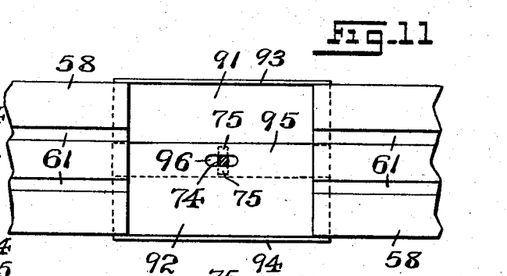
Fig. 11 is a face view of the respective end-portions of two of the form-sections or elements which do not meet end to end, said view showing in connection therewith a closure, in the form of overlapping plate-like elements, for closing the large open joint.

It may also happen, sometimes, that in the arrangement of the form-sections, two of such sections or boards will not meet end to end, thus in that case leaving a large open space, as indicated in Fig. 11 of the drawings.

Figure 12:
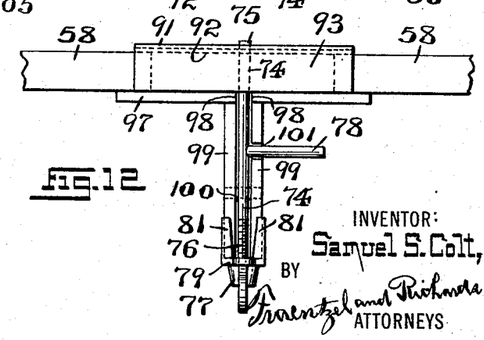
Fig. 12 is a top-edge view of the parts represented in said Fig. 11, showing in connection with said Fig. 12, a suitable fastening means for retaining the overlapping plate-like elements in their operative relation over said large open joint.

This open space may be closed by means of a short block-shaped form-section, similar in construction to the form-sections or board herein-before described, but in said Fig. 11 and in Fig. 12 I have illustrated another means for closing such open space.

This means consists, essentially, of a pair of thin sheet-metal plates, as 91 and 92, made to overlap, as at 95, said plates 91 and 92 being respectively provided with the right-angled flanges 93 and 94 for arranging the plates over the large open space, and in supporting relation with the end-portions of the form-sections or boards, so as to close the said open space. The overlapping portions 95 of said plates 91 and 92 are made with an elongated opening, as 96, for the insertion through said opening and bringing into retaining engagement with opposite face of the overlapping portions 95 and said plates 91 and 92, the retaining fingers 75 of the rod or member 74 of one of the herein-above described tying members for connecting the said plates 91 and 92 with one of the uprights 1 or 2, when, as may happen, this open space is located in front of such upright. When, however, the said space is located midway between two uprights, so that the tying device can not be attached to such upright, then I may employ the device generally represented, as to its construction in Fig. 12 of the drawings. This device consists of a base-plate or support, as 97, adapted to be placed over the said open space between the ends of the form-sections or boards, said base-plate having its end-portions in contact with the said form-sections or boards, as shown in said Fig. 12. The said base-plate has a slotted portion 98, and a pair of forwardly extending arms 99, connected by a brace 100. One of said arms 99 is also made with a recess or is cut away, as at 101, for the reception of the extension or lever 78 of the rod-like member 74 when the latter is arranged in its operative position between said arms 99, as shown in said Fig. 12. The said rod-like member 74 in this case is also provided with the perforated retaining element comprising the plate 79 and the right-angled guide-members 81 for arranging said retaining element upon the free end-portions of the said arms 99 in the manner shown. The various parts are brought into their relatively tightened or secured relation by means of the nut 77 which is mounted upon the screw-threaded shank-portion 76 of the said rod-like member 74, substantially as illustrated in said Fig. 12 and for the purposes hereinbefore described in connection with the tying devices illustrated in connection with the devices and parts represented in said Figs. 1 to 7 inclusive.

Figures 8, 9:
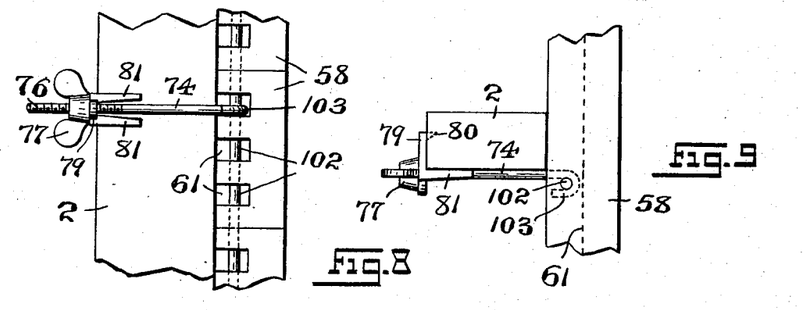
Fig. 8 is a side elevation of a portion of one of the uprights and an arrangement of form-sections or elements against said upright, showing in connection therewith a modified construction of fastening device.
Fig. 9 is a top view of the parts represented in said Fig. 8.

In Figs. 8 and 9 of the drawings, I have shown an arrangement of the said vertically stacked form-sections or boards, as 58, and a portion of an upright, as 2, which boards may be clamped so as to hold in their vertical relation in the manner previously described, provided with a modified tying means for securing said boards against the respective uprights. In this instance the form-sections or boards are provided with laterally arranged pins or rods, as 102, portions of which extend across the rabbets, grooves or channels with which the said form-sections or boards are provided.

The tying rods 74, in lieu of the fingers 75, are provided with eyes or hook-like end-portions 103 for connection with said pins or rods 102, but in all other respects the arrangement, construction and operation of the other parts of the tying device is the same as that heretofore described, except that the extension or lever 78 of the rod-like member 74 being unnecessary, is dispensed with.

Figure 10:
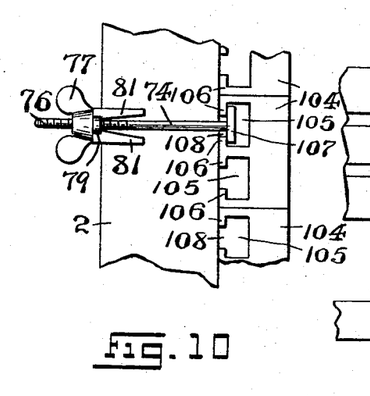
Fig. 10 is a view similar to Fig. 8, illustrating in connection therewith a modified construction of form-section or element and a modified fastening device therefor.

In Fig. 10 is illustrated another modified construction of tying means. In this case form-sections or boards 104 provided with grooves or channels 105, formed with off-set portions 106 are employed, the rod-like member or element 74 of the tying device, having right-angled extensions, as 107, which can be made to readily enter the narrow open portion 108 located between said off-set portions 106, and can be turned into holding engagement with said off-set portions 106 as shown in said Fig. 10, and for the purposes which are self-evident.

In all other respects, the arrangement, construction and operation of the other parts of the tying device is also the same as that heretofore described.

Figure 13:
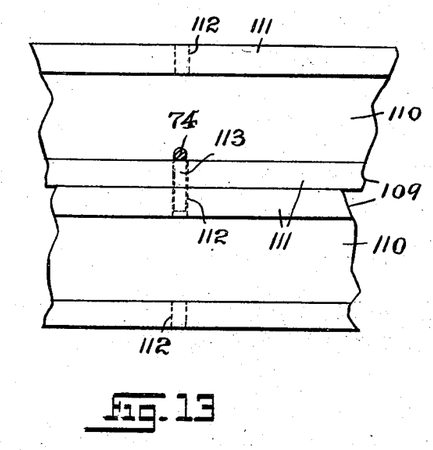
Fig. 13 is a face view of portions of two form-sections and a fastening means, illustrating another modification of the present invention.
Figure 14:
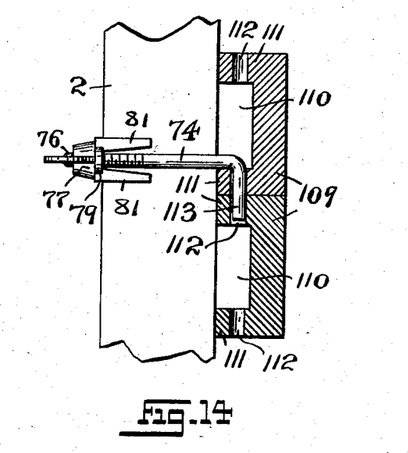
Fig. 14 is a side view of a portion of an upright, a cross-sectional representation of the form-sections or elements illustrated in said Fig. 13, and a side view of a modified fastening device for securing the said form-sections or elements against the upright.

Another modified construction and arrangement of form-sections or boards and tying devices is illustrated in Figs. 13 and 14 of the drawings.

In this construction, the said form-sections or boards which are indicated by the reference-character 109 are grooved or channeled, as at 110, the parts 111 of said form-sections or boards being made with holes or openings, as 112. The tying rod 74, in this construction, is made with an angularly bent end forming a holding hook or stud, as 113, which is inserted in the registering holes or openings 112 of the stacked form-sections or boards 109, as clearly represented in said Fig. 14 of the drawings.

Figure 15:
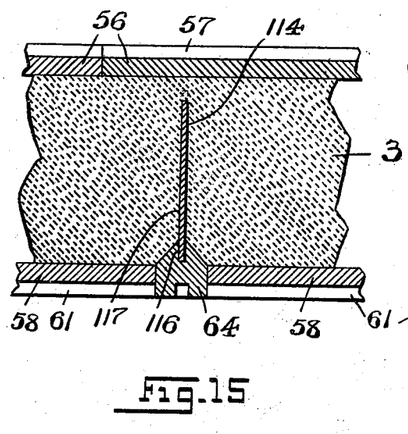
Figs. 15 and 16 are horizontal sectional representations of fragmentary portions of a concrete wall, and certain members of the cribbing, illustrating in both of said views arrangements of thin dividing members or elements, arranged to provide the concrete wall or structure with an arrangement of suitably disposed expansion joints.
Figure 16:
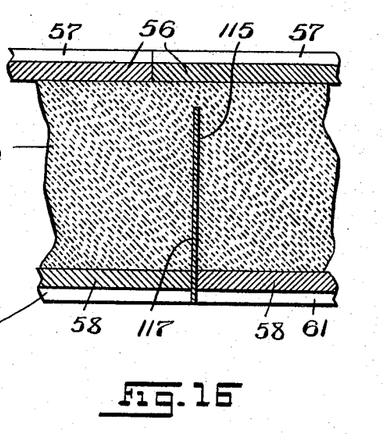

With the arrangement of the various form-sections or boards, as well as with the joint-strips of the cribbing, when it is desired to have the completed wall of concrete, or other similar material, provided with expansion joints, as 114 or 115, see Figs. 15 and 16 of the drawings, for proper expansion of the wall or structure horizontally, the small joint-strips 64 may be vertically grooved or slotted, as at 116, for the retention therein in the manner illustrated in Fig. 15, of a thin flat plate 117, of sheet-metal, card-board, or the like, or which plate 117 may be arranged between the adjacent ends of any two form-sections or boards in the manner indicated in said Fig. 16 of the drawings.

After the concrete, or other similar mixture has been poured into the trough, thus provided with any desirable arrangement of such flat dividing plates 117, and the mixture has been allowed to harden, the cribbing is removed and the said plates 117 are pulled away or removed from the artificial stone produced. The completed wall or structure will thus have in its face any desired arrangement of narrow open joints, as 114 or 115, which permits of the expansion or contraction of the wall horizontally as will be clearly evident.

The many advantages of a cribbing for use in concrete construction, or in similar work, are obvious from the foregoing description of the present invention, and need not, therefore, be more fully dwelt upon at this time, except to state that the cribbing is easily and quickly erected, is readily adjusted in its different raised positions upon the uprights 1, as the wall or structure progresses in height, and is just as quickly knocked down or dismantled when the wall or structure has been completed, to be stored away for future use in the erection of another wall or structure.

I am fully aware, that many changes may be made in the general arrangements and combinations of the various devices and parts, as well as in the details of the construction of the said parts, without departing from the scope of the present invention as set forth in the foregoing specification and as defined in the clauses of the claim which are appended to the said specification. Hence, I do not limit my present invention to the exact arrangements and combinations of the several devices and parts as described in the foregoing specification, nor do I confine myself to the exact details of the construction of any of the said parts as illustrated in the accompanying drawings.

I claim:—

1. A knock-down cribbing for use in the erection of concrete and similar structures, comprising a series of uprights, form-sections adapted to be arranged against said uprights, clamping devices for securing said form-sections edge to edge in vertically stacked relation, and tying devices adapted to be connected with said clamped form-sections and attached to said uprights.

2. A knock-down cribbing for use in the erection of concrete and similar structures, comprising a series of uprights, form-sections and interdisposed joint-strips adapted to be arranged against said uprights, clamping devices for securing said form-sections edge to edge and said joint-strips in vertically stacked relation, and tying devices adapted to be connected with said clamped form-sections and joint-strips and attached to said uprights.

3. A knock-down cribbing for use in the erection of concrete and similar structures, comprising a series of uprights, form-sections adapted to be arranged against said uprights, said form-sections being provided with channels, clamping devices for securing said form-sections in vertically stacked relation, each clamping device comprising pivotally connected arms, and gripping elements upon said arms adapted to be inserted in the channels of said form-sections, a tightening bolt and nut connected with the arms of each clamping device for forcing said gripping elements into clamped holding engagement with the channeled portions of said form-sections, and tying devices adapted to be connected with said clamped form-sections and attached to said uprights.

4. A knock-down cribbing for use in the erection of concrete and similar structures, comprising a series of uprights, form-sections adapted to be arranged against said uprights, said form-sections being provided with channels, clamping devices for securing said form-sections in vertically stacked relation, each clamping device comprising pivotally connected arms, and gripping elements upon said arms adapted to be inserted in the channels of said form-sections, a tightening bolt and nut connected with the arms of each clamping device for forcing said gripping elements into clamped holding engagement with the channeled portions of said form-sections, and tying devices adapted to be connected with said clamped form-sections and attached to said uprights, each tying device comprising a rod-like element having a screw-threaded shank-portion at one end and biting fingers at the opposite end thereof adapted to be forced into biting holding engagement with the channeled portions of said form sections, a retaining element loosely mounted upon said rod like element having a biting teat and guide-members adapted to be placed in contact with an upright, and a nut upon said screw-threaded shank-portion for forcing said retaining element and its biting teat into holding engagement with the upright.

5. A knock-down cribbing for use in the erection of concrete and similar structures, comprising a series of uprights, form-sections and interdisposed joint-strips adapted to be arranged against said uprights, said form-sections and said joint strips being provided with channels, clamping devices for securing said form-sections and said joint-strips in vertically stacked relation, each clamping device comprising pivotally connected arms, and gripping elements upon said arms adapted to be inserted in the channels of said form-sections and said joint-strips, a tightening bolt and nut connected with the arms of each clamping device for forcing said gripping elements in clamped holding engagement with the channeled portions of said form-sections and said joint-strips, and tying devices adapted to be connected with said clamped form-sections and joint-strips and attached to said uprights.

6. A knock-down cribbing for use in the erection of concrete and similar structures, comprising a series of uprights, form-sections and interdisposed joint-strips adapted to be arranged against said uprights, said form-sections and said joint-strips being provided with channels, clamping devices for securing said form-sections and said joint-strips in vertically stacked relation, each clamping device comprising pivotally connected arms, and gripping elements upon said arms adapted to be inserted in the channels of said form-sections and said joint-strips, a tightening bolt and nut connected with the arms of each clamping device for forcing said gripping elements in clamped holding engagement with the channeled portions of said form-sections and said joint-strips, and tying devices adapted to be connected with said clamped form-sections and joint-strips and attached to said uprights, each tying device comprising a rod-like element having a screw-threaded shank at one end and biting fingers at the opposite end thereof adapted to be forced into biting holding engagement with the channeled portions of said clamped form-sections and joint-strips, a retaining element loosely mounted upon said rod-like element having a biting teat and guide-members adapted to be placed in contact with an upright, and a nut upon said screw-threaded shank-portion for forcing said retaining element and its biting teat into holding engagement with the upright.

7. A knock-down cribbing for use in the erection of concrete and similar structures, comprising a series of long uprights adapted to be permanently fixed in vertical positions during the erection of the structure, a second series of shorter uprights adapted to be inwardly disposed with relation to said fixed uprights, combined retaining and spacing devices between said fixed uprights and said movably disposed uprights, form-sections adapted to be arranged against said series of uprights, clamping devices for securing said form-sections in vertically stacked relation, and tying devices adapted to be connected with said clamped form-sections and attached to the respective uprights.

8. A knock-down cribbing for use in the erection of concrete and similar structures, comprising a series of long uprights adapted to be permanently fixed in vertical positions during the erection of the structure, a second series of shorter uprights adapted to be inwardly disposed with relation to said fixed uprights, combined retaining and spacing devices between said fixed uprights and said movably disposed uprights, form-sections adapted to be arranged against said series of uprights, clamping devices for securing said form-section in vertically stacked relation, said form-sections being provided with channels, and each clamping device comprising pivotally connected arms, and gripping elements upon said arms adapted to be inserted in the channels of said form-sections, a tightening bolt and nut connected with the arms of each clamping device for forcing said gripping elements into clamped holding engagement with the channeled portions of said form-sections, and tying devices adapted to be connected with said clamped form-sections and attached to the respective uprights.

9. A knock-down cribbing for use in the erection of concrete and similar structures, comprising a series of long uprights adapted to be permanently fixed in vertical positions during the erection of the structure, a second series of shorter uprights adapted to be inwardly disposed with relation to said fixed uprights, combined retaining and spacing devices between said fixed uprights and said movably disposed uprights, form-sections adapted to be arranged against said series of uprights, clamping devices for securing said form-section in vertically stacked relation, said form-sections being provided with channels, and each clamping device comprising pivotally connected arms, and gripping elements upon said arms adapted to be inserted in the channels of said form-sections, a tightening bolt and nut connected with the arms of each clamping device for forcing said gripping elements into clamped holding engagement with the channeled portions of said form-sections, and tying devices adapted to be connected with said clamped form-sections and attached to the respective uprights, each tying device comprising a rod-like element having a screw-threaded shank-portion at one end and biting fingers at the opposite end thereof adapted to be forced into biting holding engagement with the channeled portions of said form-sections, a retaining element loosely mounted upon said rod-like element having a biting teat and guide-members adapted to be placed in contact with an upright, and a nut upon said screw-threaded shank-portion for forcing said retaining element and its biting teat into holding engagement with the upright.

10. A knock-down cribbing for use in the erection of concrete and similar structures, comprising a series of long uprights adapted to be permanently fixed in vertical positions during the erection of the structure, a second series of shorter uprights adapted to be movably disposed with relation to said fixed uprights, combined retaining and spacing devices between said fixed uprights and said movably disposed uprights, a set of form-sections adapted to be arranged against said fixed uprights, a second set of form-sections and interdisposed joint-strips adapted to be arranged against said movably disposed uprights, clamping devices for securing the various form-sections of the one set and the form-sections and the joint-strips of the other set in vertically stacked relations, and tying devices adapted to be connected with the various form-sections and the joint-strips and attached to the respective uprights.

11. A knock-down cribbing for use in the erection of concrete and similar structures, comprising a series of long uprights adapted to be permanently fixed in vertical positions during the erection of the structure, a second series of shorter uprights adapted to be movably disposed with relation to said fixed uprights, combined retaining and spacing devices between said fixed uprights and said movably disposed uprights, a set of form-sections adapted to be arranged against said fixed uprights, a second set of form-sections and interdisposed joint-strips adapted to be arranged against said movably disposed uprights, clamping devices for securing the various form-sections of the one set and the form-sections and the joint-strips of the other set in vertically stacked relations, said form-sections and said joint-strips being provided with channels, and each clamping device comprising pivotally connected arms, and gripping elements upon said arms adapted to be inserted in the channels of said form-sections and said joint-strips, a tightening bolt and nut connected with the arms of each clamping device for forcing said gripping elements into clamped holding engagement with the channeled portions of said form-sections and joint-strips, and tying devices adapted to be connected with the various form-sections and the joint-strips and attached to the respective uprights.

12. A knock-down cribbing for use in the erection of concrete and similar structures, comprising a series of long uprights adapted to be permanently fixed in vertical positions during the erection of the structure, a second series of shorter uprights adapted to be movably disposed with relation to said fixed uprights, combined retaining and spacing devices between said fixed uprights and said movably disposed uprights, a set of form-sections adapted to be arranged against said fixed uprights, a second set of form-sections and interdisposed joint-strips adapted to be arranged against said movably disposed uprights, clamping devices for securing the various form-sections of the one set and the form-sections and the joint-strips of the other set in vertically stacked relations, said form-sections and said joint-strips being provided with channels, and each clamping device comprising pivotally connected arms, and gripping elements upon said arms adapted to be inserted in the channels of said form-sections and said joint-strips, a tightening bolt and nut connected with the arms of each clamping device for forcing said gripping elements into clamped holding engagement with the channeled portions of said form-sections and said joint-strips, and tying devices adapted to be connected with the various form-sections and the joint-strips and attached to the respective uprights, each tying device comprising a rod-like element having a screw-threaded shank at one end and biting fingers at the opposite end thereof adapted to be forced into biting holding engagement with the channeled portions of said clamped form-sections and joint-strips, a retaining element loosely mounted upon said rod-like element having a biting teat and guide-members adapted to be placed in contact with an upright, and a nut upon said screw-threaded shank-portion for forcing said retaining element and its biting teat into holding engagement with the upright.

13. A knock-down cribbing for use in the erection of concrete and similar structures, comprising a series of long uprights adapted to be permanently fixed in vertical positions during the erection of the structure, a second series of shorter uprights adapted to be movably disposed with relation to said fixed uprights, combined retaining and spacing devices between said fixed uprights and said movably disposed uprights, each retaining and spacing device comprising a bar-like element adapted to be placed against a fixed upright, a screw-threaded socket mounted upon said bar-like element, a clamping device also mounted upon said bar-like element for detachably securing the same upon said fixed upright, adjusting rods respectively connected with the said socket and said clamping device, said rods being provided with right and left screw-threaded shank-portions, and clamping devices connected with said adjusting rods adapted to be brought into clamped relation with the said shorter uprights, a set of form-sections adapted to be arranged against said fixed uprights, a second set of form-sections adapted to be arranged against said movably disposed uprights, clamping devices for securing the various form-sections of the one set and the form-sections of the other set in vertically stacked relations, and tying devices adapted to be connected with the various form-sections and attached to the respective uprights.

14. A knock-down cribbing for use in the erection of concrete and similar structures, comprising a series of long uprights adapted to be permanently fixed in vertical positions during the erection of the structure, a second series of shorter uprights adapted to be movably disposed with relation to said fixed uprights, combined retaining and spacing devices between said fixed uprights and said movably disposed uprights, each retaining and spacing device comprising a bar-like element adapted to be placed against a fixed upright, a screw-threaded socket mounted upon said bar-like element, a clamping device also mounted upon said bar-like element for detachably securing the same upon said fixed upright, adjusting rods respectively connected with the said socket and said clamping device, said rods being provided with right and left screw-threaded shank-portions, and clamping devices connected with said adjusting rods adapted to be brought into clamped relation with the said shorter uprights, a set of form-sections adapted to be arranged against said fixed uprights, a second set of form-sections adapted to be arranged against said movably disposed uprights, clamping devices for securing the various form-sections of the one set and the form-sections of the other set in vertically stacked relations, and tying devices adapted to be connected with the various form-sections and attached to the respective uprights, said form-sections being provided with channels, and each clamping device comprising pivotally connected arms, and gripping elements upon said arms adapted to be inserted in the channels of said form-sections, a tightening bolt and nut connected with the arms of each clamping device for forcing said gripping elements into clamped holding engagement with the channeled portions of said form-sections, and tying devices adapted to be connected with said clamped form-sections and attached to the respective uprights.

15. A knock-down cribbing for use in the erection of concrete and similar structures, comprising a series of long uprights adapted to be permanently fixed in vertical positions during the erection of the structure, a second series of shorter uprights adapted to be movably disposed with relation to said fixed uprights, combined retaining and spacing devices between said fixed uprights and said movably disposed uprights, each retaining and spacing device comprising a bar-like element adapted to be placed against a fixed upright, a screw-threaded socket mounted upon said bar-like element, a clamping device also mounted upon said bar-like element for detachably securing the same upon said fixed upright, adjusting rods respectively connected with the said socket and said clamping device, said rods being provided with right and left screw-threaded shank-portions, and clamping devices connected with said adjusting rods adapted to be brought into clamped relation with the said shorter uprights, a set of form-sections adapted to be arranged against said fixed uprights, a second set of form-sections adapted to be arranged against said movably disposed uprights, clamping devices for securing the various form-sections of the one set and the form-sections of the other set in vertically stacked relations, and tying devices adapted to be connected with the various form-sections and attached to the respective uprights, said form-sections being provided with channels, and each clamping device comprising pivotally connected arms, and gripping elements upon said arms adapted to be inserted in the channels of said form-sections, a tightening bolt and nut connected with the arms of each clamping device for forcing said gripping elements into clamped holding engagement with the channeled portions of said form-sections, and tying devices adapted to be connected with said clamped form-sections and attached to the respective uprights, each tying device comprising a rod-like element having a screw-threaded shank-portion at one end and biting fingers at the opposite end thereof adapted to be forced into biting holding engagement with the channeled portions of said form-sections, a retaining element loosely mounted upon said rod-like element having a biting teat and guide-members adapted to be placed in contact with an upright, and a nut upon said screw-threaded shank-portion for forcing said retaining element and its biting teat into holding engagement with the upright.

16. The herein-described form-section for a knock-down cribbing for use in the erection of concrete and similar structures comprising a warpable body, as wood, formed in one of its faces with a groove or channel, and means connected with said form-section to prevent distortion or warping of the same.

17. The herein-described form-section for a knock-down cribbing for use in the erection of concrete and similar structures comprising a warpable body, as wood, formed in one of its faces with longitudinally extending grooves or channels, and laterally extending pins to prevent distortion or warping of said body.

18. In a knock-down cribbing for use in the erection of concrete and similar structures, in combination with form-sections provided with an open space, a pair of plates in engagement with said form-sections and mounted over said open space so as to close the gap, said plates having overlapping portions, so as to permit of proper adjustment of said plates to form-sections of varying widths, and means connected with said plates for securing the same in position over said open space.

19. In a knock-down cribbing for use in the erection of concrete and similar structures, in combination with form-sections provided with an open space, a pair of plates having overlapping portions, so as to permit of proper adjustment of the said plates to form-sections of varying widths, said plates having portions in engagement with said form-sections and mounted over said open space so as to close the gap, and means connected with said plates for securing the same over said open space.

20. The herein-described combined retaining and spacing means for a knock-down cribbing for use in the erection of concrete and similar structures, comprising a bar-like element, a screw-threaded socket mounted upon said bar-like element, a clamping device also mounted upon said bar-like element, adjusting rods respectively connected with said socket and said clamping device, said rods being provided with right and left screw-threaded shank-portions, and clamping devices connected with said adjusting rods.

21. The herein-described combined retaining and spacing means for a knock-down cribbing for use in the erection of concrete and similar structures, comprising a bar-like element, a screw-threaded socket mounted upon said bar-like element, a clamping device also mounted upon said bar-like element, adjusting rods respectively connected with said socket and said clamping device, said rods being provided with right and left screw-threaded shank-portions, and clamping devices connected with said adjusting rods, and a reinforcing rod-supporting means connected with and extending from one of said clamping devices.

22. The herein-described combined retaining and spacing means for a knock-down cribbing for use in the erection of concrete and similar structures, comprising a bar-like element, a screw-threaded socket mounted upon said bar-like element, a clamping device also mounted upon said bar-like element, adjusting rods respectively connected with said socket and said clamping device, said rods being provided with right and left screw-threaded shank-portions, and clamping devices *connected with said adjusting rods, each clamping device consisting of a block-like body having oppositely extending pivot-members, clamping jaws pivotally connected with said pivot-members, and a binding bolt and nut connected with each pair of jaws for operating said jaws.

23. In combination with channeled form-sections of a knock-down cribbing, a clamping means consisting of a pair of pivotally connected arms, a gripping element connected with each arm for engagement with the channeled form-sections, and means connected with said arms for opening said arms.

24. In combination with channeled form-sections of a knock-down cribbing, a clamping means consisting of a pair of pivotally connected arms, a gripping element connected with each arm for engagement with the channeled form-sections, and a binding bolt and nut connected with said arms for operating said arms.

25. The herein-described tying means for use with form-sections of a knock-down cribbing, consisting of a tying rod having a screw-threaded shank-portion, a binding nut upon said screw-threaded shank-portion, means connected with said rod for securing said rod to a form-section, and a retaining element mounted upon said rod, comprising a plate-like body, a biting teat extending from said body, and guide-arms also connected with and extending from said body.

26. The herein-described tying means for use with form-sections of a knock-down cribbing, consisting of a tying rod having a screw-threaded shank-portion, a binding nut upon said screw-threaded shank-portion, biting fingers connected with said rod, and means also connected with said rod for turning said biting fingers into holding relation with a form-section.

27. The herein-described tying means for use with form-sections of a knock-down cribbing, consisting of a tying rod having a screw-threaded shank-portion, a binding nut upon said screw-threaded shank-portion, biting fingers connected with said rod, and means also connected with said rod for turning said biting fingers into holding relation with a form-section, and a retaining element mounted upon said rod.

28. The herein-described tying means for use with form-sections of a knock-down cribbing, consisting of a tying rod having a screw-threaded shank portion, a binding nut upon said screw-threaded shank-portion, biting fingers connected with said rod, and means also connected with said rod for turning said biting fingers into holding relation with a form-section, and a retaining element mounted upon said rod, comprising a plate-like body, a biting teat extending from said body, and guide-arms also connected with and extending from said body.

29. A knock-down cribbing for use in the erection of concrete and similar structures, a series of uprights, form-sections adapted to be arranged against said uprights, clamping devices for securing said form-sections in vertically stacked relation, and means connected with and extending from said form-sections, adapted to provide the structure with depressions producing expansion joints.

30. A knock-down cribbing for use in the erection of concrete and similar structures, a series of uprights, longitudinally disposed form-sections and interdisposed longitudinally and vertically extending joint-strips, means for securing said form-sections and joint-strips in assembled relation against said uprights, and means connected with and extending from said vertically disposed joint-strips, adapted to provide the structure with depressions producing expansion joints.

31. In a knock-down cribbing for use in the erection of concrete and similar structures, a main carrying element, form-sections arranged against said carrying-element, a clamping means for clamping said form-sections edge to edge and tying means for securing said form-sections against said main carrying element.

In testimony, that I claim the invention set forth above I have hereunto set my hand this 26th day of July, 1916.

SAMUEL S. COLT.

Witnesses:
 FREDK. C. FRAENTZEL,
 FREDK. H. W. FRAENTZEL.

Copies of this patent may be obtained for five cents each, by addressing the "Commissioner of Patents Washington, D. C."